March 17, 1953  F. M. SMITH  2,632,027
PRODUCTION OF PHENOLIC COMPOUNDS
Filed June 17, 1949
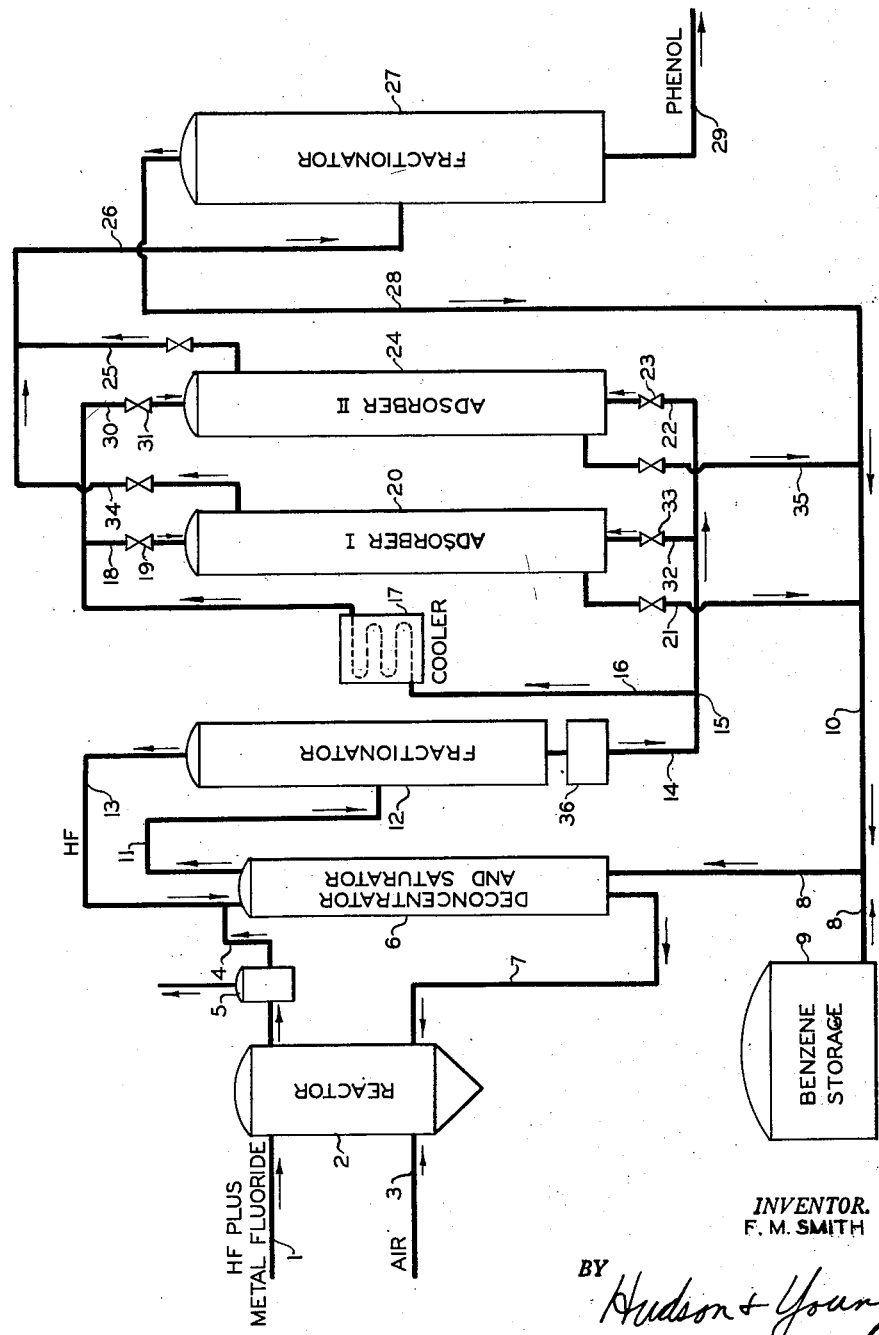
INVENTOR.
F. M. SMITH
BY Hudson & Young
ATTORNEYS Patented Mar. 17, 1953

2,632,027

UNITED STATES PATENT OFFICE 2,632,027

PRODUCTION OF PHENOLIC COMPOUNDS

Fredrick M. Smith, Bartlesville, Okla., assignor to Phillips Petroleum Company, a corporation of Delaware Application June 17, 1949, Serial No. 99,750

15 Claims. (Cl. 260—621)

This invention relates to the production of phenolic compounds. In some of its preferred embodiments it relates to the recovery of phenolic compounds formed by oxidation of aromatic hydrocarbons. Certain aspects of the invention pertain to the recovery of phenol present in small concentrations in benzene. The invention has particular application to the oxidation of aromatic hydrocarbons in the presence of liquid hydrogen fluoride.

Heretofore, one of the principal sources of phenolic compounds has been from the destructive distillation of bituminous coal. However, the increasing demands of the chemical industry have created a need for new sources of these materials.

The oxidation of aromatic compounds by an oxygen-containing gas to provide phenolic compounds is well known in the art. These oxidations have been effected both in the liquid and vapor phases and numerous catalysts have been employed to activate the reaction. However, several disadvantages are inherent in such processes. In general, the reaction is difficult to control and may easily proceed to such an extent that, rather than providing the desired phenolic compounds as the principal product, the oxidation may convert considerable amounts of the hydrocarbon feed to carbon oxides or mixtures of undesirable products, probably because the oxidation of phenolic compounds is often more readily effected than that of an aromatic hydrocarbon. Furthermore the reaction rate may become accelerated until serious explosion hazards are incurred.

In any process for making phenols from aromatic hydrocarbons, maximum ultimate yields of phenols are seemingly inconsistent with high perpass yields. When a large concentration of phenol begins to build up in the reaction mixture when benzene is being oxidized, for example, the rate at which phenol undergoes further oxidation to end products approaches and ultimately equals that at which benzene is being converted into the phenol. Hence it would be very desirable to be able to operate always with a low concentration of phenol in benzene, but this presents serious problems of recovering the phenolic compound from such a dilute solution without excessive equipment and operating cost.

An object of this invention is to convert aromatic hydrocarbons into phenolic compounds.

Another object is to recover phenols which have been formed by reaction of aromatic hydrocarbons with free oxygen.

A further object is to provide an improved overall process for converting an aromatic hydrocarbon into a corresponding phenol by oxidizing same while dissolved in liquid hydrogen fluoride and applying specific recovery steps to the reaction mixture allowing sufficient removal of the phenol present therein in low concentrations.

Yet another object is to recover phenol from a solution thereof in benzene.

A still further object is to effect removal of phenol from a benzene-HF oxidation reaction mixture while simultaneously re-saturating the mixture with benzene to replace that which has been converted to phenol.

Another object is to oxidize one or more aromatic hydrocarbons in the presence of hydrogen fluoride and a metal fluoride catalyst and solubilizing agent, all being present in a single liquid phase.

Another object is to subject an aromatic hydrocarbon having a phenolic compound dissolved therein to an adsorption-desorption treatment effecting continuous concentration of the phenolic compound therein.

Further objects and advantages of the invention will be apparent to one skilled in the art, from the accompanying disclosure and discussion.

I have now discovered a process for the production of phenolic compounds from the oxidation of aromatic hydrocarbons wherein efficiency of the system is greatly enhanced by a novel adsorption-desorption concentration system forming an integral part thereof. According to a preferred embodiment of the process of my invention an aromatic hydrocarbon is oxidized by an oxygen-containing gas in a single phase catalyzed oxidation system wherein the concentration of phenolic product is maintained below a definite low limit by the operation of a deconcentrator integrated therewith, and which is described below in further detail. The product stream from the said deconcentrator, comprising a dilute solution of the phenolic product in the parent hydrocarbon, is circulated through an adsorption-desorption step wherein a portion of the said product stream is employed as the desorbing agent. By the operation of this step the concentration of phenolic product in the stream to the fractionator is increased severalfold.

The adsorption-desorption step of my process is preferably carried out by contacting the dilute phenolic compound solution from the oxidation mixture deconcentrator with a solid adsorbent material, such as silica gel, at a low temperature, generally in the range 45 to 100° F. At this temperature a major portion of the dissolved phenolic product is adsorbed and the solvent is returned to the oxidation step via the deconcentrator. Desorption is effected using a portion of the dilute phenolic solution as the desorbing agent, the temperature for the desorbing part of the cycle preferably being in the range 200 to 250° F. In most instances it is preferred to employ two adsorption-desorption units connected in parallel each being operated alternately for adsorption and desorption, the adsorbing part of the cycle in one unit being carried out on a portion of the dilute phenolic compound solution while the remainder of the solution is used simultaneously to desorb phenolic product in the other unit.

In the operation of my process, I have found that the concentration of product in the effluent stream from the deconcentrator can be increased from three to tenfold in the adsorption-desorption step. By so concentrating the phenolic product solution the volume of the fractionating equipment required can be greatly reduced and operating costs correspondingly reduced.

In the oxidation step of my process the aromatic hydrocarbon used as feed stock is incorporated in what is preferably a single phase liquid system comprising the said aromatic hydrocarbon, a selected metal fluoride or other catalyst and hydrofluoric acid. In this system the metal fluoride serves the combined functions of a solubilizing agent for the aromatic hydrocarbon in the hydrofluoric acid and a catalyst for the oxidation reaction. Thus when the oxygen-containing gas is introduced into the liquid oxidizing system, effective contacting of hydrocarbon, oxygen, and catalyst is effected and maximum efficiency in the oxidation is realized.

The metal fluorides employed as the catalyst and solubilizing agent will preferably be silver or ferric fluoride. However, the fluorides of copper, cobalt, nickel, molybdenum, and chromium are likewise applicable. Other suitable agents are disclosed hereinbelow.

According to the precepts of my invention, a competing oxidation of phenolic product to undesirable materials occurs when the concentration of the said phenolic product rises above a fixed low level, usually from about 1 to 5 per cent. In order that the oxidation of aromatic hydrocarbon to the corresponding phenolic compound may continue as the principal reaction, the contents of the oxidation reactor are continuously circulated through a deconcentrating chamber where the phenolic component is removed. Thus the concentration of phenolic material in the liquid oxidation system is maintained at a low level and the oxidation is directed substantially in its entirety to the aromatic hydrocarbon and to the production of valuable phenolic product.

The deconcentration step of my process operates in a countercurrent manner, a portion of the aromatic hydrocarbon used as a feed stock to the oxidation being employed as the deconcentrating liquid. In the operation of this step two concomitant functions are realized. Phenolic material produced in the oxidation reaction is removed as in a simple extraction and conveyed to the fractionation and adsorption system for isolation and recovery as product, and simultaneously with this extraction phase of the process the oxidation solution is resaturated with aromatic hydrocarbon from the deconcentrating stream. Thus in its circulation through the deconcentration zone, the oxidation solution is continuously deconcentrated with respect to phenolic product and replenished with aromatic hydrocarbon up to its saturation point. By suitable regulation of the rate of circulation through the deconcentrator, a balance is obtained whereby a substantially quantitative yield of phenolic product is obtained from the oxidation. Furthermore, at the steady state, replenishment of aromatic hydrocarbon in the oxidation system is effected by resaturation in the deconcentration step.

The advantages of my process will be further apparent from a description of the accompanying drawing in which is shown a schematic flow diagram for one specific embodiment of the process. It will be understood, of course, that various necessary items of auxiliary equipment such as pumps, valves, heat exchangers, control equipment, and the like, have not been shown on the drawing since their use will be understood by those skilled in the art.

Referring to the drawing, an oxidation solution prepared by mixing benzene, concentrated hydrofluoric acid which is preferably substantially anhydrous, and a selected metal fluoride, is introduced via line 1 into reactor 2 where it is intimately mixed with air introduced via line 3. Oxidation conditions are regulated to provide a low extent of conversion. As the oxidation proceeds a stream of the oxidation mixture is conveyed via line 4 containing air separator 5 through deconcentrator 6 and back to the reactor via line 7. Unit 6 is any suitable equipment giving effective contacting of two immiscible liquids, for instance a packed tower. In the deconcentration zone 6 the circulating stream of oxidation solution is contacted with a stream of benzene drawn through line 8 from storage 9 and/or from recycle line 10, preferably in the proportion of 2 to 5 volumes of benzene to 1 volume of oxidation solution. By thus contacting the oxidation solution with benzene, phenol contained therein is removed to solution in the said benzene and conveyed through line 11 to fractionator 12. Concomitantly with the deconcentration of the oxidation solution with respect to phenol, resaturation of the said solution with benzene is effected, thus providing a continuous controlled benzene feed to the system. The rate of deconcentration can be adjusted within broad limits by suitable regulation of the rates of flow of benzene and of oxidation mixture through the deconcentration zone. I have generally preferred to operate in a manner such that from about 50 to about 75 per cent of the phenol is removed since complete deconcentration involves the use of rather large volumes of benzene, and is unnecessary.

In fractionator 12 dissolved hydrofluoric acid in the product stream together with a small amount of benzene is removed overhead and restored to the oxidation mixture in the deconcentrator via line 13, or is passed to line 1 by means not shown. The dilute phenol solution discharged from the bottom of the column through line 14 passes through a filter or other suitable unit 36 for removal of any small quantity of metal fluoride or other solid catalytic agent present therein. The stream is then divided at point 15, one portion, preferably 65 to 75 per cent of the stream, being conveyed through line 16 containing cooler 17 and introduced via line 18 containing valve 19 into column 20 for the adsorbing part of the cycle. This column is charged with silica gel upon which, at a temperature of about 50° F., more than 75 and generally more than 95 per cent of the phenol content of the incoming stream is adsorbed, the benzene being discharged via lines 21 and 10 to deconcentrator 6.

The remaining portion of the dilute phenolic compound solution not diverted at point 15 through line 16 is conveyed via line 22 containing valve 23 to column 24 containing silica gel which has been saturated with adsorbed phenolic product during the previous part of the process cycle. The temperature of the entering stream will preferably be in the range 200–250° F., which level may have been established in fractionating column 12 or by a suitable heater (not shown) in line 22. At this temperature, desorption of the adsorbed product from the silica gel is effected thereby increasing the concentration of phenolic product in the solution severalfold. The desorbed phenol is thus added to the phenol contained in the benzene solution in line 22, which latter phenol does not have to be adsorbed at all in the process but passes through zone 24 unadsorbed. The thus-concentrated solution is discharged from column 24 via lines 25 and 26 to fractionator 27. Here benzene solvent is removed overhead and restored to the circulating system via lines 28 and 10. Phenol is removed via product line 29 for storage or immediate use.

When the adsorption part of the cycle in column 20 and the desorption part of the cycle in column 24 are complete the streams are switched by diverting the cold stream from line 16 to column 24 via line 30 containing valve 31 and the hot stream from line 22 to column 20 via line 32 containing valve 33. In this part of the cycle, the concentrate from column 20 is conveyed to fractionator 27 via lines 34 and 26, and stripped solvent from column 24 is returned to circulation through lines 35 and 10.

The amount of phenolic product adsorbed by silica gel is largely a function of the concentration of the solution and of the temperature at which the adsorption is effected. At a given concentration of phenol in the stream from the oxidation step, the degree of adsorption will have a fixed value at a given temperature, proceeding to a definite fixed maximum. With an increase in temperature this maximum will be diminished to a lower value. Thus by adsorbing phenolic product on silica gel from a solution of phenol of a fixed low concentration until the maximum saturation value of the silica gel is reached, then contacting the saturated adsorbent with a solution of the same concentration as used in the adsorption part of the cycle, at a considerably higher temperature, desorption of phenol into the solution occurs. Thus concentration of the phenol from one to as high as tenfold can be effected by selecting the proper temperature differential.

While I have generally preferred to operate with a single-stage adsorption-desorption system in my process, still further concentration can be effected by passing the concentrate through a second or even a third system, each system comprising two units operating alternately as described in the foregoing embodiment. Such extension of my process is within the scope of the present invention. Furthermore, instead of using a fixed bed of adsorbent first for adsorption and then desorbing it, a continuous countercurrent adsorption system in which the particles of absorbent are moved through adsorption and desorption zones in known manner may be used.

The adsorbing agent used in the adsorption-desorption system of my process will preferably be silica gel, generally in the form of fine granules or particles. Powdered silica gel which will pass 200 mesh is quite suitable. However, activated charcoal or chars, activated alumina, bauxite, adsorbent clays or earths, and the like are also applicable. These materials can be used over long periods of operation without the necessity of regeneration or replacement.

A significant advantage of the preferred methods of operating the oxidation step of my invention lies in the elimination of separate hydrocarbon-rich and catalyst-rich phases in the oxidation system. Aromatic hydrocarbons such as benzene, toluene, the xylenes, and the like, and hydrofluoric acid are mutually soluble to an extent of not more than about three per cent at ordinary temperatures and this degree of solubility is not markedly increased by elevation in the temperature level. However, certain metal fluorides have a solubilizing effect on these substantially immiscible materials and by addition of a metal fluoride to the hydrofluoric acid in the proper ratio, solutions of aromatic hydrocarbon in hydrofluoric acid containing the said metal fluoride can be prepared in a broad range of concentrations. For example, solutions containing 23 per cent, 41 per cent, and 54 per cent benzene by weight are obtained by using hydrofluoric acid (98 per cent) containing silver fluoride in HF : AgF weight ratios of 8:1, 4:1, and 3:1 respectively. Thus homogeneous systems are readily obtained for use in the oxidation step in which the proportion of aromatic hydrocarbon may be adjusted over a wide range, and since the metal fluoride acts not only as the solubilizing agent for the hydrocarbon and hydrofluoric acid but also as a catalyst for the reaction, the highly advantageous nature of this discovery is apparent. Naturally I do not operate with metal fluoride percentages so high as to give complete miscibility with the aromatic hydrocarbon at conditions maintained in deconcentration-saturator 6.

Another advantage lies in the substantial elimination of the explosion hazards inherent in processes where a separate hydrocarbon rich phase exists in contact with an oxygen containing gas. In my process intimate contacting of hydrocarbon, catalyst, and oxygen is effected with all the advantages of such intimate contacting but without the hazards incurred in two phase liquid oxidation systems heretofore employed.

A still further advantage of the present process lies in its applicability to continuous operation. The continuous deconcentration of the oxidation system with respect to phenol maintains the efficiency of the reaction at the optimum level at all times without the necessity of intermittent operation or shutdowns to remove product and adjust the ratios of reactants.

Still further advantages lie in the operability of the oxidation system at lower temperatures than ordinarily used in the oxidation of aromatic hydrocarbons and in the inert nature of a substantial, often a major portion of the reactor contents with respect to oxidation, namely the hydrofluoric acid and metal fluoride constituents. These features of the process contribute substantially to reduction in explosion hazards.

In its broader aspects, it has been found desirable but not essential to the practice of this invention to employ an "oxygen carrier" in addition to HF in the oxidation step. The term "oxygen carrier" is used in its accepted sense, namely, an element or compound of an element which in a reaction medium where both oxidizing and reducing conditions simultaneously exist will reversibly change its valence. Thus, the particular substance acts as a means of transporting the oxygen from the available source, that is, the oxidizing agent to the reducing substance, that is, the aromatic hydrocarbon to be oxidized. A great variety of substances have been found suitable for this purpose. These include finely divided silver, silver oxide, silver fluoride, etc.; the element or oxides of arsenic, selenium, iron, molybdenum, vanadium, uranium, tungsten, manganese, chromium, copper, etc.; selenic acid, arsenic acid, etc. Although the carrier is frequently added as the element or oxide, the fluorides or oxyfluorides are certainly present in most cases due to the action of the anhydrous hydrogen fluoride. Because of the oxidizing action of the oxygen or other oxidizing agent present and also due to the reducing action of the organic substance, the valence of the oxygen carrier is afforded an opportunity to reversibly change.

By way of example, the silver may be added either as the metal, the oxide or the fluoride, etc., while the arsenic may be added as arsenious acid, arsenic acid, or the salts of either of these acids, arsenious oxide, arsenic oxide, arsenic trichloride, arsenic pentachloride, arsenic trifluoride, arsenic pentafluoride, or as any of the oxychlorides, bromides, fluorides, etc.

Although the addition of an oxygen carrier is preferred it is not essential for carrying out the oxidation process since the oxidation reaction will take place in the absence of any added oxygen carrier. Because of the extremely wide range of substances that may be used as oxygen carriers, it is believed, as above stated, that these substances act as a means of transporting the oxidation properties of the oxygen source to the molecules of the aromatic compound to be oxidized and, therefore, that any substance which can reversibly undergo a valence change in the same reaction medium can serve in this capacity. For example, silver can both dissolve the oxygen and carry it in the dissolved condition to the aromatic compound, or it can form silver oxide, fluoride or oxyfluoride with the attendant valence change and thus carry the oxidizing property. The arsenic compounds, for example, can undergo the valence change from the three to the five valent forms and vice versa, thus serving as the oxygen carriers.

In some cases mixtures of oxygen carriers may be employed in carrying out the oxidation-reduction reaction. Without the addition of the carrier to the reaction mixture, the reaction rate is slower. The various oxygen carriers act in a somewhat similar manner, insofar as the oxidation is concerned, but of course there are some minor differences.

The composition of the oxidation solution may be varied over fairly broad limits by regulating the ratio of metal fluoride to hydrofluoric acid. That is, for solutions rich in aromatic hydrocarbon, the ratio will be larger than for those in which saturation is reached at lower concentration. The concentration of aromatic hydrocarbon will generally be from 10 to 60, preferably from 15 to 50 weight per cent, with ratios of metal fluoride to hydrofluoric acid between 1:10 and 1:2, preferably from 1:7 to 1:3, the ratios being expressed on a weight basis.

Conditions for the oxidation may vary over a rather wide range, and are each dependent upon the other to a considerable degree. Usually temperatures in the range of 100 to 300° F., preferably from 150 to 250° F., and air or oxygen pressures in the range of 50 to 1000 pounds per square inch gauge, will provide optimum operation. However, broader ranges of conditions, such as temperature of 30 to 400° F., are permissible. Residence time will vary from two minutes to two hours, depending on the temperature employed, the particular metal fluoride or other oxygen carrier employed as catalyst, and the ratio of components in the oxidation system.

The process of my invention is adaptable to the production of phenolic compounds generally, preferably by oxidation of aromatic hydrocarbons. For example, it is applicable to the production of the corresponding phenolic compounds from benzene, toluene, the xylenes, ethyl benzene, naphthalene and the like. The hydrofluoric acid used should be concentrated, and preferably should initially comprise about 75 to 99 per cent hydrogen fluoride, the balance being largely or entirely water.

I prefer to effect oxidation of an aromatic hydrocarbon or mixture of aromatic hydrocarbons in the presence of hydrogen fluoride to form a solution of resulting phenolic compound or compounds in the parent hydrocarbon material. However, the concentrating steps of my process may be applied if desired to solutions of phenols in hydrocarbons derived from other sources.

The length of the adsorption and desorption parts of the cycle can be determined by checking the phenol content of the effluent stream from the respective units. While adsorption or desorption are active the maximum difference will exist in the phenolic content of the input and effluent streams. As the saturation or desaturation of the adsorbent material is approached the phenolic content of the input and effluent becomes more and more nearly the same, approaching the concentration of the stream from the oxidation step. Switching of the streams in the system is made at such time as to maintain the most constant and efficient operation.

The following examples are presented to illustrate various features of the process, and suitable conditions and materials therefore. It is to be understood that the particular conditions and materials specified are not necessarily coextensive with the invention in its broadest aspects.

EXAMPLE I

Four runs were made to demonstrate the effectiveness of the preferred single phase oxidation system as compared with a two phase system and with an oxidation system in which no oxygen carrier was used. In every case, the charges described are made up in parts by weight.

In the first run, the reactor was charged with 48.2 parts of benzene and 44.2 parts of 98 per cent hydrofluoric acid, these constituents being solubilized by the use of 10.6 parts of silver fluoride which also had the function of an oxidation catalyst. This solution was agitated with oxygen at a temperature of 153° F. under a pressure of 570 pounds per square inch gauge for two hours.

The second reactor was charged with 49.7 grams of benzene, 40.4 grams of hydrogen fluoride, and 9.9 grams of silver oxide to serve as catalyst. The system was agitated with oxygen at a temperature of 150° F. and under a pressure of 570 pounds per square inch gauge for two hours.

The third reactor was charged with 61.5 parts of benzene, 30.8 parts of hydrofluoric acid and 7.7 parts of silver oxide to serve as catalyst. This system was agitated with oxygen under the same conditions employed in the first run.

The charge to the fourth reactor was made up of 50.3 parts of benzene and 49.7 parts of hydrofluoric acid, no added catalyst being used. Oxidation was carried out under conditions approximately the same as used in the preceding runs.

When the runs were completed the reaction effluents were removed and analyzed to determine the conversion of benzene to phenol calculated as per cent based on benzene charged (parts phenol per 100 parts benzene charged). Results of the four runs are tabulated below:

*Table*

| Run | Catalyst in Addition to HF | Number Phases in Effluent | Benzene Conversion (Percent) | Oxidation Byproducts |
|---|---|---|---|---|
| 1 | Silver Fluoride | 1 | 0.49 | None. |
| 2 | Silver Oxide | 1 | 0.57 | Do. |
| 3 | do | 2 | 0.30 | Do. |
| 4 | None | 2 | 0.14 | Do. |

EXAMPLE II

A run was made according to the method of run 1, preceding example. In this run the charge comprised 13.4 parts benzene, 69.2 parts 98 per cent hydrofluoric acid and 17.4 parts ferric fluoride to act as the solubilizing agent and oxidation catalyst. Oxidation was effected by agitation of this solution with oxygen for thirty minutes at 150° F., the pressure being held at 500 pounds per square inch gauge. There was obtained a yield of 0.44 part by weight of phenol which is equivalent to a conversion of 2.42 per cent of the benzene charged.

EXAMPLE III

A reactor is charged with 48.2 parts of benzene, 44.2 parts of 98 per cent hydrofluoric acid and 10.6 parts of silver fluoride, all parts being on a weight basis. This solution is agitated with oxygen at a temperature of 153° F. under a pressure of 570 pounds per square inch gauge. The effluent stream is deconcentrated according to the method described herein and illustrated in the accompanying flow sheet. A sample taken from the product line from the first fractionator, designated in the drawing as line 14, shows a phenol content of 0.14 per cent by weight.

The adsorption column (column 20 in the drawing) is charged with 200 mesh silica gel and maintained at a temperature of 50° F. Effluent from the column shows a phenol content of 0.005 weight per cent, a reduction of approximately 97 per cent. The concentration of adsorbed phenol on the silica gel increases until tests on a sample of the gel show adsorption of 2.13 per cent by weight of phenol based on the gel. At this point adsorption practically ceases as indicated by rising of the phenol content in the effluent stream to a value substantially equal to that of the stream entering the column, namely 0.14 per cent (by weight).

The column and the stream from the oxidation unit are then heated to 200° F. and the flow again started. Column effluent, which contains 91 per cent of the adsorbed phenol, has a concentration of 0.67 per cent, an increase of more than 400 per cent. In subsequent runs no diminution is noted in the adsorbing power of the silica gel.

While specific and generally preferred embodiments and conditions have been described above in detail, it will be appreciated that various modifications may be employed within the broad scope of the invention. Thus, suitable flow rates through adsorbents for adsorption and desorption will vary considerably with the particle size, as well as the particular material, which is employed, but are readily determined by simple experiment. With 200-mesh silica gel, both the adsorption and the desorption may be effected within the general range of from 0.5 to 10 liquid volumes per volume of gel per hour, with optimum rates usually ranging from 1 to 6 volumes/volume/hour.

I claim:

1. A method of converting an aromatic hydrocarbon to its corresponding phenolic compound which comprises subjecting same to oxidation with an oxidizing agent in the presence of liquid hydrogen fluoride at temperatures within the range of 30 to 400° F. to produce a dilute solution of the phenolic compound in an aromatic hydrocarbon-HF liquid, contacting said liquid with a stream of said aromatic hydrocarbon to transfer phenolic compound from said liquid to said stream forming a phenolic compound-rich stream and to replenish the aromatic hydrocarbon content of said liquid, returning the resulting replenished liquid to contact with said oxidizing agent for production of more phenolic compound, passing said phenolic compound-rich stream through a first body of solid adsorbent material capable of adsorbing phenolic compound at conditions effecting an adsorption of phenolic compound from said stream, continuing said adsorption treatment until the adsorption efficiency decreases to an undesired extent, then passing a portion of said stream through a second body of such an adsorbent at conditions effecting adsorption of phenolic compound therefrom while passing another portion of said stream through said first body of adsorbent at a higher temperature to desorb phenolic compound from said first body of adsorbent, subjecting resulting phenolic compound-rich solution to distillation to recover the phenolic compound content thereof from the aromatic hydrocarbon, continuing the last mentioned procedure until the adsorption efficiency of said second body of adsorbent decreases to an undesired extent, then passing a portion of said stream through said first body of adsorbent which has been denuded of phenolic compound to effect adsorption of phenolic compound from said solution and passing another portion of said stream through said second body of adsorbent at a higher temperature to desorb phenolic compound therefrom, and subjecting resulting phenolic compound-rich solution from said second adsorbent to distillation to recover the phenolic compound content thereof from the aromatic hydrocarbon.

2. The process of claim 1 in which the aromatic hydrocarbon recovered by said distillations is returned to contact with said dilute solution of phenolic compound in aromatic hydrocarbon-HF liquid.

3. The process of claim 1 in which an added oxygen-carrier is dissolved in said hydrogen fluoride.

4. The process of claim 1 in which sufficient metal fluoride oxygen carrier is dissolved in said hydrogen fluoride to solubilize the aromatic hydrocarbon and form a single-phase liquid reaction mixture.

5. The process of claim 1 in which benzene as said aromatic hydrocarbon is converted to phenol as said phenolic compound.

6. The process of claim 1 in which aromatic hydrocarbon having a lowered content of phenolic compound is withdrawn from contact with adsorbent material and returned to contact with said dilute solution of phenolic compound in aromatic hydrocarbon-HF liquid.

7. The process of claim 1 in which said phenolic compound-rich stream of aromatic hydrocarbon obtained by contacting said aromatic hydrocarbon with said solution of phenolic compound in aromatic hydrocarbon-HF liquid is, prior to contact with said solid adsorbent material, subjected to distillation to remove dissolved hydrogen fluoride therefrom.

8. An improved method for recovering phenolic compounds from dilute solutions thereof in liquid hydrocarbon materials which comprises passing such a solution through a first body of solid adsorbent material capable of adsorbing phenolic compounds at conditions effecting adsorption of phenolic compounds from said solution, continuing said adsorption treatment until the adsorption efficiency decreases to an undesired extent, then passing a portion of said solution through a second body of such an adsorbent at conditions effecting adsorption of phenolic compounds therefrom while passing another portion of said solution through said first body of adsorbent at a higher temperature to desorb phenolic compounds from said first body of adsorbent, subjecting the resulting phenolic compound-rich solution to distillation to recover the phenolic compound content thereof from the hydrocarbon material, continuing the last mentioned procedure until the adsorption efficiency of said second body of adsorbent decreases to an undesired extent, then passing a portion of said solution through said first body of adsorbent which has been denuded of phenolic compound to effect adsorption of phenolic compound from said solution and passing another portion of said solution through said second body of adsorbent at a higher temperature to desorb phenolic compound therefrom, and subjecting the resulting phenolic compound-rich liquid from said second adsorbent to distillation to recover the phenolic compound content thereof from the hydrocarbon material.

9. The process of claim 8 in which said adsorbent material is silica-gel.

10. The process of claim 8 in which the adsorption is effected at 45 to 100° F. and the desorption is effected at 200 to 250° F.

11. The process of claim 8 in which said phenolic compound is phenol.

12. In the recovery of phenolic compounds from dilute solutions thereof in a hydrocarbon immiscible solvent comprising concentrated liquid hydrogen fluoride the improvement which comprises intimately contacting such a solution with a liquid hydrocarbon material thereby transferring phenolic compound from said solvent into solution in said hydrocarbon material, passing one portion of resulting hydrocarbon solution through a body of a solid adsorbent material capable of adsorbing phenolic compounds at conditions effecting adsorption of phenolic compounds from said hydrocarbon solution, thereafter passing another portion of said hydrocarbon solution through the resultant phenolic compound-laden adsorbent at a higher temperature and thereby desorbing said phenolic compound to produce a second hydrocarbon solution richer in same than the aforesaid hydrocarbon solution, and distilling said second solution to separate the hydrocarbon content thereof from the phenolic compound.

13. The process of claim 12 in which said phenolic compound is phenol.

14. The process of claim 12 in which hydrocarbon solution of phenolic compounds obtained by contacting said liquid hydrocarbon material with said hydrocarbon immiscible solvent comprising concentrated liquid hydrogen fluoride is, prior to contact with said solid adsorbent material, subjected to distillation to remove dissolved hydrogen fluoride therefrom.

15. In the recovery of phenolic compounds from dilute solutions thereof, in a liquid hydrocarbon material by distilling of the hydrocarbon content of such solutions from the phenolic compounds, the method of avoiding distilling all of said hydrocarbon from such solution and thereby reducing the amount of heat required to be supplied as heat of vaporization which comprises passing one portion of such a solution through a body of a solid adsorbent material capable of adsorbing phenolic compounds at conditions effecting adsorption of phenolic compounds from such solutions thus separating phenolic compound from hydrocarbon without vaporizing the hydrocarbon content of said one portion, thereafter passing another portion of said solution through resultant phenolic compound laden adsorbent at a higher temperature and thereby desorbing said phenolic compound to produce a second solution richer in same than the starting solution, and distilling said second solution to separate the hydrocarbon content thereof and thus recovering phenolic content of both said one and said another portions of solution while vaporizing only the hydrocarbon content of said another portion.

FREDRICK M. SMITH.

REFERENCES CITED

The following references are of record in the file of this patent:

UNITED STATES PATENTS

| Number | Name | Date |
|---|---|---|
| 2,043,102 | Kester | June 2, 1936 |
| 2,331,244 | Strickland | Oct. 5, 1943 |
| 2,343,165 | Adler | Feb. 29, 1944 |
| 2,398,101 | Lipkin | Apr. 9, 1946 |
| 2,530,369 | Simons | Nov. 21, 1950 |

OTHER REFERENCES

Simons et al.: Ind. Eng. Chem., vol. 39, 364–7 (1947).